Jan. 4, 1955   C. R. STOUGH   2,698,566
PLANTER PRESS WHEEL
Filed Jan. 15, 1952   2 Sheets-Sheet 1
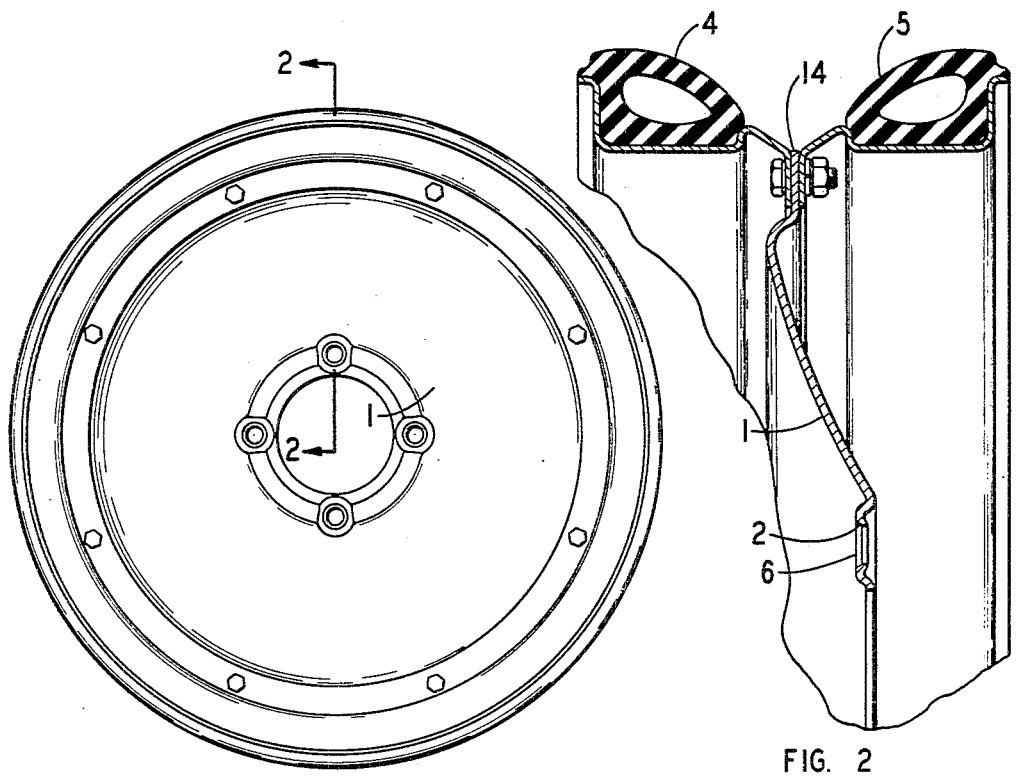
FIG. 1
FIG. 2
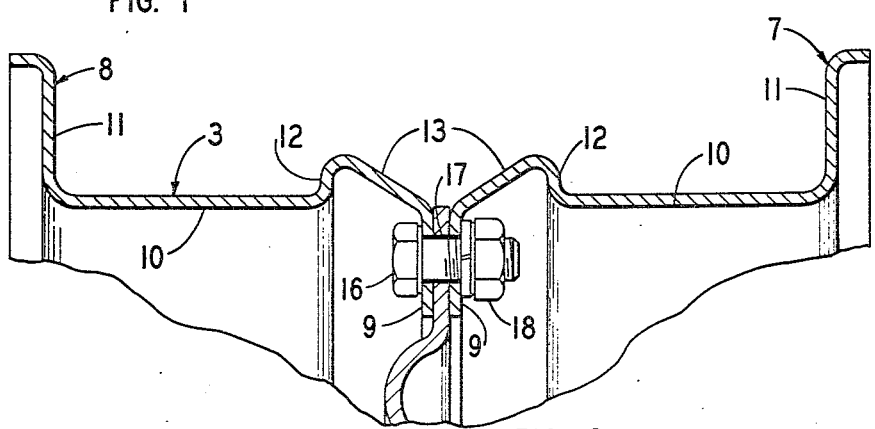
FIG. 3
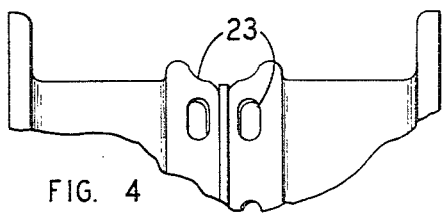
FIG. 4
*INVENTOR.*
CHARLES R. STOUGH
BY
*Barnes, Kisselle, Laughlin & Raisch*
ATTORNEYS Jan. 4, 1955     C. R. STOUGH     2,698,566
PLANTER PRESS WHEEL Filed Jan. 15, 1952     2 Sheets-Sheet 2

*INVENTOR.*
CHARLES R. STOUGH
BY
Barnes, Kisselle, Laughlin & Raisch
ATTORNEYS

United States Patent Office 2,698,566
Patented Jan. 4, 1955

2,698,566

PLANTER PRESS WHEEL

Charles R. Stough, Lansing, Mich., assignor to Motor Wheel Corporation, Lansing, Mich., a corporation of Michigan Application January 15, 1952, Serial No. 266,486

5 Claims. (Cl. 97—56)

This invention relates to a planter press wheel.

A planter press wheel is the wheel that rolls along behind an agricultural planter wheel and presses the soil firmly on each side of the row where the seeds have been planted but does not apply any pressure directly on top of the seed row.

It is an object of this invention to produce a planter press wheel of simple and relatively inexpensive structure and which can be easily assembled and disassembled.

In the drawings:

Fig. 1 is an elevation of the wheel assembly.

Fig. 2 is a half section through the wheel body, rim and tires.

Fig. 3 is an enlarged section of the rim and its attachment to the wheel body.

Fig. 4 shows a modified form of rim.

Figure 5:
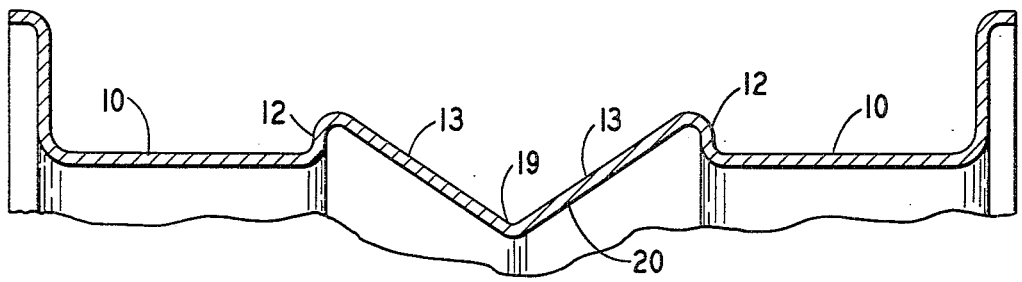
Fig. 5 is a section through the rim at the end of the rolling operation and before it is severed into two rim portions.
Figure 6:
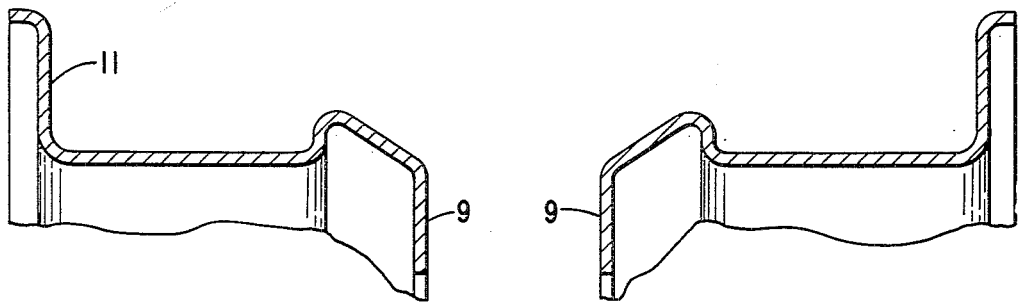
Fig. 6 shows the rim after it has been severed in the bottom of the V groove and the flanges turned down for mounting purposes.
Figure 7:
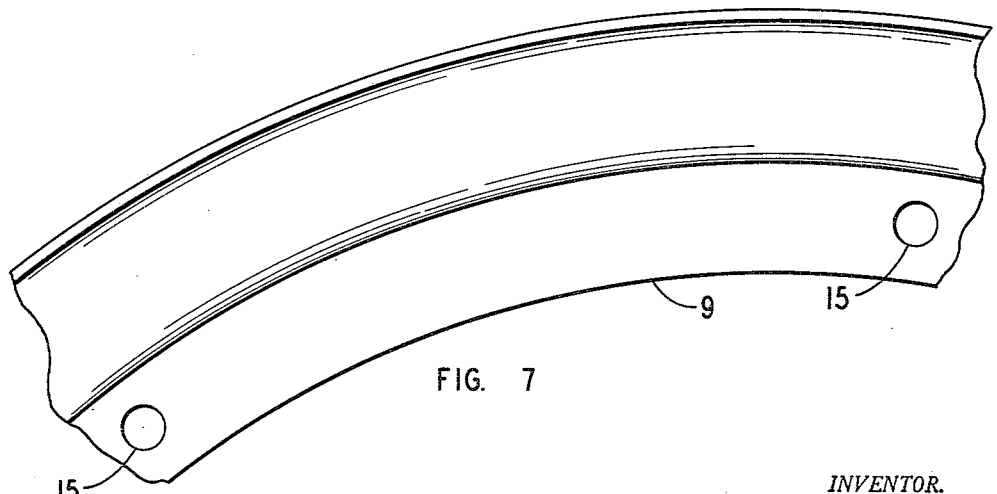
Fig. 7 is a fragmentary side view of the rim showing the apertures for the bolts for mounting the rim to the wheel.

Referring more particularly to the drawings there is shown a planter press wheel comprising a wheel body 1 having a central bolting-on flange 2, a rim generally designated 3, and two hollow rubber tires 4 and 5. The bolting-on flange is preferably stamped sheet steel and provided with a plurality of bolt openings 6 arranged annularly about the axis of the body.

The rim 3 comprises two substantially symmetrical portions generally designated 7 and 8. Each rim portion preferably takes the form of a metal stamping having a radially inwardly extending ring portion 9 located in a plane substantially perpendicular to the axis of the wheel, a cylindrical tire seat portion 10 flanked on the outside by flange 11 and on the inside by flange 12. Flanges 11 and 12 extend radially outwardly from the tire seat 10 and flange 11 has a greater height or radial extent than flange 12. A tapered conical portion 13 connects the outer circumferential portion of each flange 12 with the outer circumferential portion of each ring 9. Conical portions 13 taper radially inwardly from flange 12 toward ring 9 and thus provide a conical surface over which the hollow rubber tires 4 can be slipped axially in assembling the tires 4 and 5 on their respective tire seats 10. Flanges 11 and 12 cooperate with seat 10 to retain the tires 4 and 5 on the rim 3 in spaced relation.

Conical portions 13 cooperate to form a V groove 14 positioned radially inwardly of the radially outer face of tires 4 and 5. Hence, as the press wheel rolls over the seed row, tires 4 and 5 are positioned on opposite sides of the seed row with V groove 14 located over the seed row. Thus, direct pressure is applied to the ground on either side of the seed row by the inclined faces of tires 4 and 5 but no pressure is applied directly on top of the seed row because groove 14 is located radially inwardly from the outer radial faces of the tires 4 and 5.

Rings 9 are provided with holes 15 which are aligned with holes 17 in wheel body 1. Bolts 16 are passed through the holes 15 and 17 and nuts 18 turned down to bolt the rings 9 on opposite sides of, and to the outer circumferential portion of wheel body 1.

In fabricating the rim a strip of sheet steel is rolled to the configuration shown in Fig. 5 and then severed along the apex 19 of the groove portion 20 to form two separate rim portions. Thereafter the flanges are turned inwardly to form the bolting-on rings 9.

Before the rim portions 10 are bolted to the wheel body 1, hollow rubber tires 4 and 5 are stretched over the conical flanges 13 and inner flange or bead 12 so that the outer side wall of the tire presses against the inner race or flange 11 and the inner side wall of the tire presses against the inner race of the inner flange 12.

In the form shown in Fig. 4 a plurality of circumferentially spaced openings 23 are cut through the conical flanges 13 which will allow some of the dirt to pass through to the inside of the wheel thus making the wheel self-cleaning and preventing the clogging of groove 14.

It will be appreciated that by forming the tires with conically shaped, circumferential faces and mounting these tires on a wheel in the manner shown in Fig. 2, a generally outward axial pressure is exerted on the tire when the wheel rolls along a mount of dirt where seeds have been planted. By forming the outer rim flange substantially wider than the inner rim flange, a construction is provided wherein the tire holds its shape in use. Thus, the provision of a narrow inner flange and a substantially wider outer flange enables the tires to be readily mounted on the wheel; and at the same time, the wider outer flange resists the axially outwardly directed pressure on the tires when in use.

I claim.

1. A planter press wheel comprising a wheel body having a central bolting-on flange, two substantially identical rim portions positioned in symmetrical relation on opposite sides of said wheel body, each rim portion having a radially inwardly extending ring adapted for securement to said wheel body, a tire seat adapted to receive a rubber tire, a radially outwardly extending flange along the outer edge of said seat, a radially outwardly extending flange along the inner edge of said seat, and a conical flange portion connecting said inner flange and ring, said outer flange having substantially greater radial extent than said inner flange and terminating radially outwardly of said inner flange whereby said flanges cooperate with the seat to retain thereon a rubber tire having inner and outer side walls of unequal width with the tire positioned axially outwardly of the plane of the wheel body and said conical portions coact to form a central groove located radially inwardly of the outer peripheries of said outer flanges.

2. A planter press wheel comprising a wheel body having a central bolting-on flange, two substantially identical rim portions positioned in symmetrical relation on opposite sides of said wheel body, each rim portion having a radially inwardly extending ring adapted for securement to said wheel body, a substantially cylindrical tire seat extending axially of said wheel and adapted to receive a rubber tire, a radially outwardly extending circular flange along the outer edge of said seat, a radially outwardly extending circular flange along the inner edge of said seat, and a conical flange portion connecting said inner flange and ring, said outer flange having substantially greater radial extent than said inner flange and terminating radially outwardly of said inner flange whereby said flanges cooperate with the seat to retain a rubber tire thereon positioned axially outwardly of the plane of the wheel body and said conical portions coact to form a central groove located radially inwardly of the outer peripheries of said outer flanges.

3. The planter press wheel defined in claim 2 wherein said cylindrical tire seat, radial and conical flanges, and ring are integral.

4. The planter press wheel defined in claim 3 wherein each ring is positioned in a plane substantially perpendicular to the axis of the wheel.

5. The planter press wheel defined in claim 2 including rubber tires mounted on said seats between the radial flanges, the outer circumferential faces of said tires extending radially outwardly from said central groove whereby when the wheel rolls along the ground the wheel acts through said tires to apply direct pressure to the ground on either side of said central groove, said tires having inner and outer side wall faces extending radially inwardly from said outer circumferential faces, said outer side wall faces being substantially wider than said inner side wall faces, said outer side wall faces engaging said outer flanges and said inner side wall faces engaging said inner flanges.

References Cited in the file of this patent

UNITED STATES PATENTS

| | | |
|---|---|---|
| 1,880,641 | Woodward | Oct. 4, 1932 |
| 1,994,375 | Wagenhorst | Mar. 12, 1935 |
| 2,249,637 | Rietz | July 15, 1941 |